Patented May 9, 1933

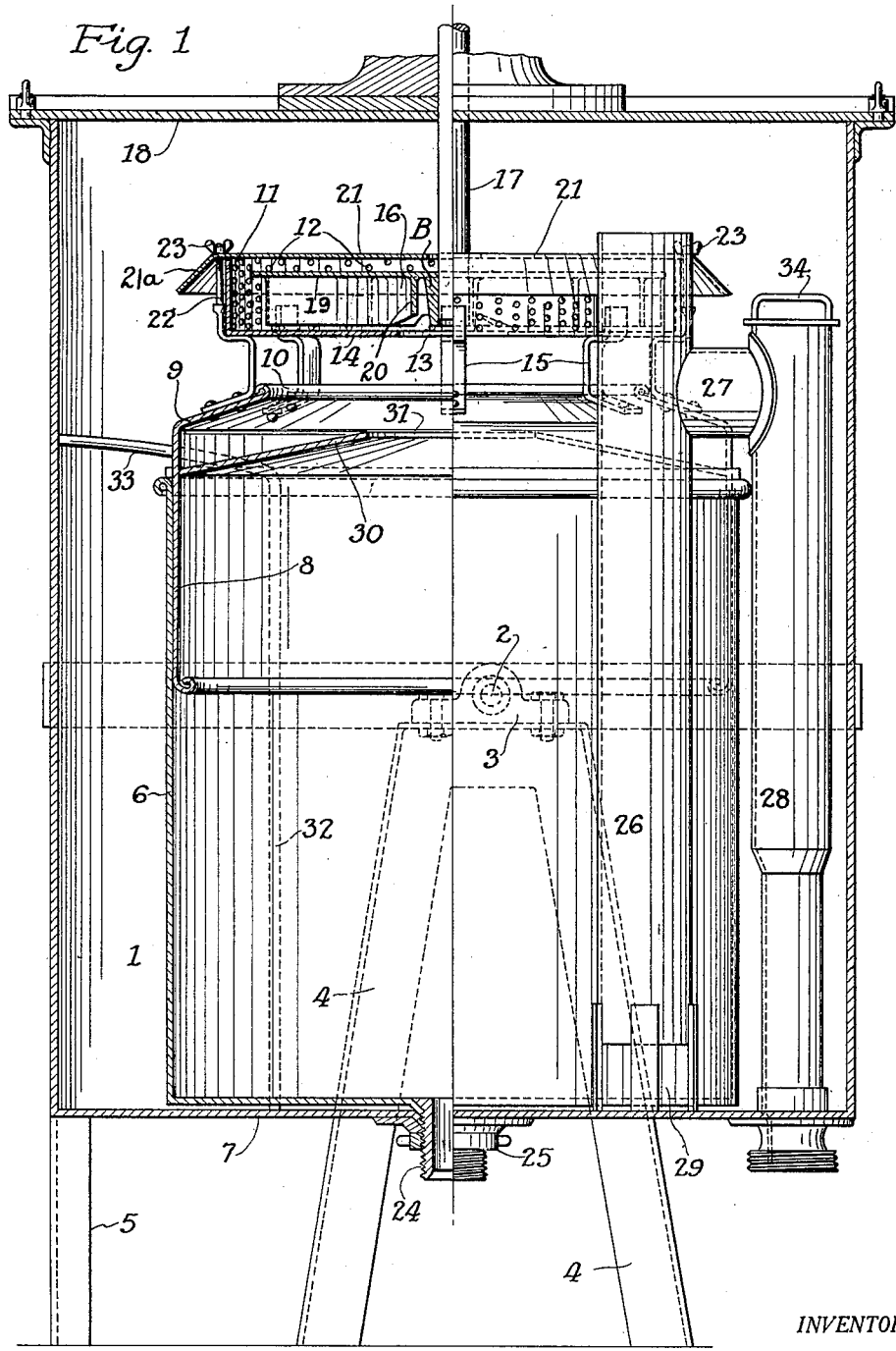

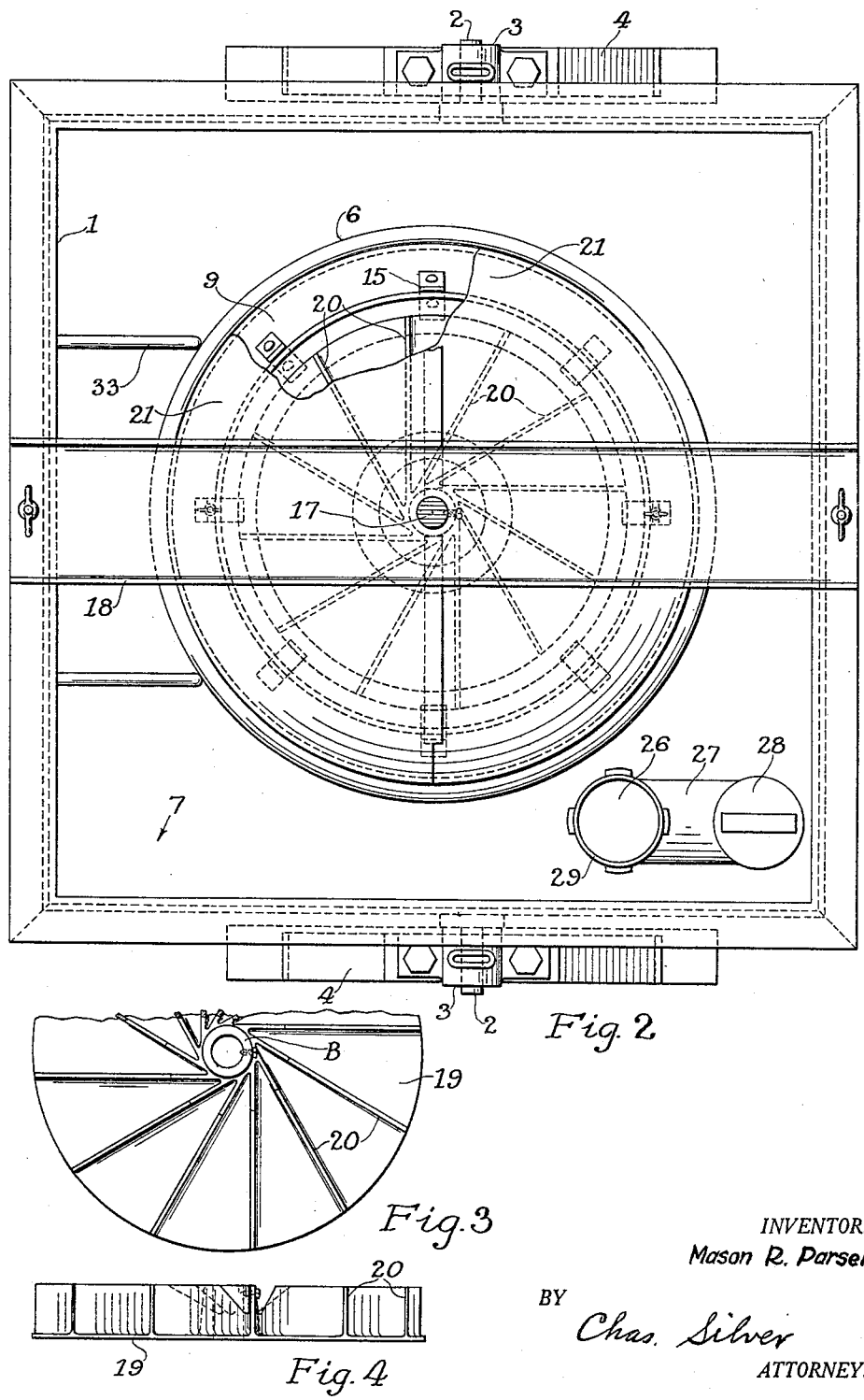

1,907,439

UNITED STATES PATENT OFFICE

MASON RAYMOND PARSELL, OF BALTIMORE, MARYLAND

APPARATUS FOR ELIMINATING FOAM FROM MILK AND OTHER LIQUIDS

Application filed March 26, 1930. Serial No. 438,977.

This invention relates to a process and apparatus for destroying foam in milk and other liquids and more particularly the treatment of skimmed milk to yield a frothless product.

When milk is skimmed, the treatment which it undergoes in the cream separator introduces undesirable quantities of air that result in an excessive amount of foam or froth. This froth or foam has been found very objectionable in the subsequent handling and treatment of skimmed milk and it is highly desirable to free the milk from this objectionable association.

Among the objects of this invention is to provide a process and apparatus for breaking up the froth in skimmed milk and other liquids and to liberate the gas contained therein and thus render the liquid substantially gas-free. A further object of this invention is to provide a process and apparatus for accomplishing these results in a simple, effective, efficient and highly improved manner.

Other, further and more specific objects of this invention will become readily apparent to persons skilled in the art from a consideration of the following description when taken in conjunction with the accompanying drawings wherein:

Fig. 1 is a vertical section showing a specific embodiment of the foam destroying mechanism.

Fig. 2 is a top plan view of the device shown in Fig. 1 and with the driving mechanism removed.

Fig. 3 is a bottom plan view of a part of the rotor.

Fig. 4 is a side elevation of the rotor in inverted position.

The apparatus comprises the outer vessel 1 mounted on trunnions 2 journaled in a suitable bearing 3 fastened upon the legs or supports 4. The vessel 1 can be tilted into position for ready cleaning and washing of the interior. The trunnions 2 are not radial with respect to the circumference of the vessel 1 but are positioned slightly to one side of the diameter in order that the vessel 1 will tip in one direction only, preferably forwardly but not rearwardly. A block or support 5 is placed at the front end of the vessel 1 to limit the downward movement. By this means the vessel 1 is stable when the milk or other liquid is introduced therein and will not vibrate as when it is evenly balanced on the trunnions.

Within the vessel 1 is a cylindrical inner chamber 6 extending from near the bottom 7 of the vessel 1 to a point above the middle of the vessel 1. A drum 8 having a frustro-conical top 9 fits tightly into the top of the chamber 6 and the frustro-conical top 9 has an open neck 10 at the constricted middle portion. A collecting collar or pan 11 having the perforations 12 in its cylindrical wall is also provided with a large central opening 13 in its bottom 14 and rests upon the legs or brackets 15 attached to the frustro-conical top 9 of the drum 8. The collecting collar 11 may be withdrawn vertically from the supporting brackets 15 but, when in operative position and resting upon the brackets 15, the bottom 14 of the collecting collar is slightly above the neck 10 of the drum 8. Satisfactory results may be obtained by having the perforations 12 about $\frac{1}{32}$ of an inch diameter, and spaced $\frac{1}{32}$ of an inch from each other, or if the perforations 12 are not circular the cross-sectional area of each should correspond to the above size.

A rotor 16, which is keyed to the shaft 17 and joined thereby to some suitable source of power such as an electric motor, is disposed so that it may be lowered into and raised from the collecting collar or pan 11, the shaft passing through the support 18. The rotor 16 comprises the top plate 19 and a plurality of downwardly projecting vanes 20, which are preferably integral with the plate 19. The vanes are non-radial with respect to the center and periphery of the rotor 16, and are of practically uniform depth from the periphery of the rotor to a distance beyond the middle of their lengths, the depth then receding toward the inner extremity of each vane. By so cutting away the vanes 20 at their inner extremities there is formed a frustro-conical cavity in the rotor 16 which is disposed immediately above the opening 13 in the pan 11 when the rotor 16 is in operation and serves as an inlet for delivering froth or foam to the passages between the vanes 20. The top of the collecting collar 11 is open, but I have found it desirable when the apparatus is in use to provide a cover consisting of the detachable portions 21, which are held in position by means of the bolts 22 and nuts 23 secured to the oppositely disposed brackets 15. When in operation, the vanes 20 are about ¼ of an inch above the bottom 14 of the pan 11. In order to impart additional strength to the rotor there may be provided the protuberance or boss B extending from the plate 19 through the frustro-conical cavity in the rotor 16 to practically the same depth as the vanes 20. The support 18 forms part of the top cover of the vessel 1 and this cover together with the two detachable portions 21 of the cover resting upon the collecting collar 11 prevent splashing of the liquid out of the apparatus.

The milk or other liquid to be treated is introduced into the inner chamber 6 from a suitable source of supply through the inlet pipe 24 which is connected by a coupler 25 to a pipe or conduit leading to the source of supply. The milk flows upwardly through the chamber 6 and then through the drum 8 and passes out through the open neck 10. The frustro-conical dome 9 and constricted neck 10 operate to converge the flow of milk so that it will issue from the drum 8 immediately below the central opening 13 in the base 14 of the collecting collar or pan 11. The rotor 16 having been set in motion, as the milk passes out of the neck 10, some of the lighter froth or foam will be continually sucked upwardly through the opening 13 and the frustro-conical cavity in the rotor 16 and then projected outwardly through the passages between the vanes 20 and thrown against the perforated cylindrical wall of the collar 11. The effect of this lifting action by the rotor and the high velocity and great impact of the milk against the perforated wall will break up the foam, thereby releasing the occluded air or gas and freeing the milk therefrom. The degassed milk passes out through the perforations 12 and drops into the main body of milk in the vessel 1 and outside of the chamber 6.

The foam-free milk gravitates to the bottom of the vessel 1 and is withdrawn therefrom by means of an inverted-U passage located within the vessel 1 and between its outer wall and the inside chamber 6 and passes upwardly through the leg 26 over the bridge 27 and out through the other leg 28 of the inverted-U passage to a storage chamber or to other apparatus for further treatment. The open end of the leg 26 is disposed within a well 29 so that the milk which is withdrawn is taken from the bottom of the vessel 1. The inverted-U passage serves to regulate the level of the liquid in the vessel 1.

When the rotor 16 is in motion, a very vigorous circulation and whirling movement is set up in the liquid within the chamber 6 and drum 8. This circulating and whirling liquid causes the entire apparatus to shake and vibrate to a very objectionable extent and also draws foam into the interior of the body of milk. In order to overcome this I provide the drum 8 with a false bottom 30, having an opening 31. The area of this opening 31 is about 10 to 20 per cent that of the neck 10 of the drum 8. This false bottom 30 effectively arrests circulation and whirling motion of the liquid and thus eliminates this objectionable shaking and vibration of the apparatus and keeps the foam at the top of the liquid instead of creating an objectionable mixture of foam and milk.

When cleaning and washing this apparatus it is often desirable to withdraw the inner chamber 6 and drum 8. This may be readily accomplished with applicant's device by removing the collar 11, rotor 16 and support 18 from the vessel 1, tilting the vessel 1 until its axis is approximately horizontal, detaching the coupler 25 from the pipe 24, and then withdrawing the chamber 6 and drum 8. When reintroducing the chamber 6 into the vessel 1, in order to facilitate alignment of the pipe 24 with the opening in the bottom 7 of the vessel 1, I have provided guide rods 32 extending upwardly from the bottom 7 of the vessel 1 and having the arms or bends 33 by which the rods are connected to the wall of the vessel 1.

For the purpose of cleaning the inverted-U passage, and to admit of inspection, I preferably provide a detachable cover 34 at the top of the leg 28.

The bridge 27 of the inverted-U is adjusted so that when the apparatus is in use the level of the liquid in the space between the vessel 1 and chamber 6 is about 6 to 8 inches below the neck 10 of the drum 8. The operation of the rotor 16 causes an upward suction of air and foam and an outward discharge of the air and the components of the treated foam through the perforations 12. The overhanging frusto-conical parts 21a of the cover portions 21 serve to deflect the outwardly discharged air and the froth components downwardly and centrally into the froth upon the liquid between the vessel 1 and the chamber 6 and this pressure of the air which is very substantial drives the froth toward the center where suction is taking place.

When a mass of froth is subjected to treatment by my process and apparatus, it is not broken up entirely, a small portion being discharged through the perforations 12 along with the milk which has been freed of the occluded air and this froth mixes with the mass of froth to be again lifted away by the rotor 16.

When the apparatus is in operation, the top of the froth is slightly above the neck 10 of the drum 8, but does not reach the bottom 14 of the collecting collar or pan 11. The rotor continuously lifts some of the froth through a height of several inches from the top of the froth and this lifted froth undergoes the treatment of my new process.

Skimmed milk treated by my new apparatus and according to my new process is rendered substantially frothless, and is very well adapted for the various processes employing skimmed milk as a basic material in the manufacture of a wide variety of dairy products.

Although in the specific examples given herein, skimmed milk is used in illustration, it is to be understood that my new process and apparatus may be employed for the treatment of nonskimmed milk as well as other liquids for the purpose of removing air and other gases therefrom and destroying the foam or froth therein.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

This application is a continuation-in-part of my co-pending application Ser. No. 374,120, filed June 27, 1929.

I claim as my invention:

1. In an apparatus for treating froth and foam of liquids, a vessel, a chamber within said vessel, means for introducing liquid in said chamber, means for limiting the liquid level in said vessel, means for limiting circulation of liquid within said chamber, a rotor within said vessel for lifting by suction part of the froth away from the main body of froth, said rotor comprising a top plate with vanes extending downwardly therefrom and forming a central cavity and a plurality of passages extending from the central cavity to the periphery of the rotor, and a collecting pan having a perforated wall surrounding said rotor and a bottom disposed in spaced relation and close to the vanes of said rotor, said bottom having a central opening registering with the central cavity in said rotor, said inner chamber having a constricted outlet positioned below the central cavity of the rotor for directing the froth toward the central cavity of said rotor and said rotor and pan being disposed above and near to the top surface of the foam on the body of liquid.

2. In an apparatus for treating froth and foam of liquids, a vessel, a chamber within said vessel, means for introducing liquid in said chamber, means for limiting circulation of liquid within said chamber, a rotor within said vessel for lifting by suction part of the froth away from the main body of froth, said rotor comprising a top plate with vanes extending downwardly therefrom and forming a central cavity and a plurality of passages extending from the central cavity to the periphery of the rotor, a collecting pan having a perforated wall surrounding said rotor and a bottom disposed in spaced relation and close to the vanes of said rotor and means for directing toward the central cavity of said rotor undecomposed froth issuing from the perforated wall, said bottom of the collecting pan having a central opening registering with the central cavity in said rotor, said inner chamber having a constricted outlet positioned below the central cavity of the rotor for directing the froth toward the central cavity of said rotor and said rotor and pan being disposed above and near to the top surface of the foam on the body of liquid.

3. In an apparatus for treating froth and foam of liquids, a vessel, means for limiting the liquid level in said vessel, a rotor within said vessel for sucking foam from the liquid therein, said rotor comprising a top plate with vanes extending downwardly therefrom and forming a central cavity and a plurality of passages open at the bottom and extending from the central cavity to the periphery of the rotor, and a collecting pan having a perforated wall surrounding the rotor and a bottom disposed in spaced relation and close to the free edges of the vanes of said rotor, said free-edged vanes constituting means for cutting foam upon the bottom of the collecting pan and simultaneously dragging and pushing the said foam around the collecting pan and into said passages formed by the vanes, said bottom of the collecting pan operating to oppose transmission to the body of liquid in said vessel of the whirling motion of the body of air in the suction part of the device containing said rotor and said bottom of the collecting pan having a central opening registering with the central cavity in said rotor.

4. In an apparatus for treating froth and foam of liquids, a vessel, a rotor within said vessel for sucking foam from the liquid therein, said rotor comprising a top plate with vanes extending downwardly therefrom and forming a central cavity and a plurality of passages open at the bottom and extending from the central cavity to the periphery of the rotor, a collecting pan having a perforated wall surrounding the rotor and a bottom disposed in spaced relation and close to the free edges of the vanes of said rotor, said free-edged vanes constituting means for cutting foam upon the bottom of the collecting pan and simultaneously dragging and pushing the said foam around the collecting pan and into said passages formed by the vanes and means for directing toward the central cavity of said rotor undecomposed froth issuing from the perforated wall, said bottom of the collecting pan operating to oppose transmission to the body of liquid in said vessel of the whirling motion of the body of air in the suction part of the device containing said rotor and said bottom of the collecting pan having a central opening registering with the central cavity in said rotor.

In testimony whereof I affix my signature.

MASON RAYMOND PARSELL.